United States Patent
Nusbickel

Patent Number: 6,055,525
Date of Patent: Apr. 25, 2000

[54] DISPARATE DATA LOADER

[75] Inventor: Wendi Lynn Nusbickel, Delray Beach, Fla.

[73] Assignee: International Business Machines Corporation, Armonk, N.Y.

[21] Appl. No.: 08/978,186

[22] Filed: Nov. 25, 1997

[51] Int. Cl.[7] .................................................. G06F 17/30
[52] U.S. Cl. .................................... 707/1; 707/103
[58] Field of Search ............................. 707/10, 100, 501, 707/1, 103

[56] References Cited

U.S. PATENT DOCUMENTS

| | | | |
|---|---|---|---|
| 5,778,367 | 7/1998 | Wesinger, Jr. et al. | 707/10 |
| 5,848,424 | 12/1998 | Scheinkman et al. | 707/501 |
| 5,878,421 | 3/1999 | Ferrel et al. | 707/100 |

OTHER PUBLICATIONS

Teresa M. Beck et al.—U.S. Ser. No. 08/978,240—Filed: Nov. 25, 1997—"Method and Apparatus for Allowing Online Directory Producers to Preview Advertisement in Online Directory Listings".

*Primary Examiner*—Anton W. Fetting
*Assistant Examiner*—Cheryl Lewis
*Attorney, Agent, or Firm*—Gunster, Yoakley, Valdes-Fauli & Stewart, P.A.; Jon A. Gibbons

[57] ABSTRACT

A method and system for moving disparate data objects type into database applications is disclosed. The disparate data objects can be either retrievable locally or retrievable remotely. The method consists of: (1) creating a moving object; (2) locating a specified source data type; (3) creating sub-data objects associated with the moving object where in the sub-data objects further comprise a source data object for receiving a specified source data type and a target data object associated with said database application; and (4) converting the specified source data type to be compatible with the target data object; and moving the moving object with the specified source data after being translated into the database application.

14 Claims, 2 Drawing Sheets

DISPARATE DATA LOADER

FIELD OF THE INVENTION

The present invention relates to information processing systems that include data bases, and more particularly, it relates to a method and system of importing disparate data objects into databases.

BACKGROUND OF THE INVENTION

Traditional paper telephone directory listings like the White Pages, Yellow Pages and industry specific directory listings have been known and used for decades. Online or Web-based directory listings are the Online analogues to their familiar, traditional paper counterparts. With the advent of the Internet and the Web (World-Wide-Web), many owners and publishers of these directories have begun to offer their services Online. These Online directory services are expanding beyond providing simply name, address and telephone information and have begun to offer E-mail directory listings, Web page address listings, fax directory listings, consumer tips directory listings, emergency provider directory listings and much more.

As in the case of their traditional paper counterparts, the publishers of these Online directory listings sell advertising space to businesses and organizations to cover the expense of compiling these directories. One of the advantages to advertisers in the Web medium over the paper medium is the use of multimedia in advertising. Multimedia technologies such as text, graphics, audio and full motion video on the Web are becoming common.

Nevertheless, the need to update Online Directory listings in a fast efficient method is hampered by the fact that the data source for the Online Directory entries, i.e., the name, street address, phone numbers, etc., are often stored in disparate and distinct custom formats by the owners and publishers of this data. The need to quickly load source data information from these separate directory listing entries into an Online Listing database is required. In addition, the ability to load disparate data sources whose format may change or be revised is essential.

SUMMARY OF THE INVENTION

Briefly in accordance with the present invention, a method and system for moving disparate data objects into database applications is disclosed. The disparate data objects can be retrieved either locally or remotely. The method consists of: (1) creating a moving object; (2) locating a specified source data type; (3) creating sub-data objects associated with the moving object wherein the sub-data objects further comprise a source data object for receiving a specified source data type and a target database object associated with said database application; and (4) converting the specified source data type to be compatible with the target database object; and moving the moving object with the specified source data after being translated into the database application.

BRIEF DESCRIPTION OF THE DRAWING(S)

DESCRIPTION OF A PREFERRED EMBODIMENT

Figure 1:
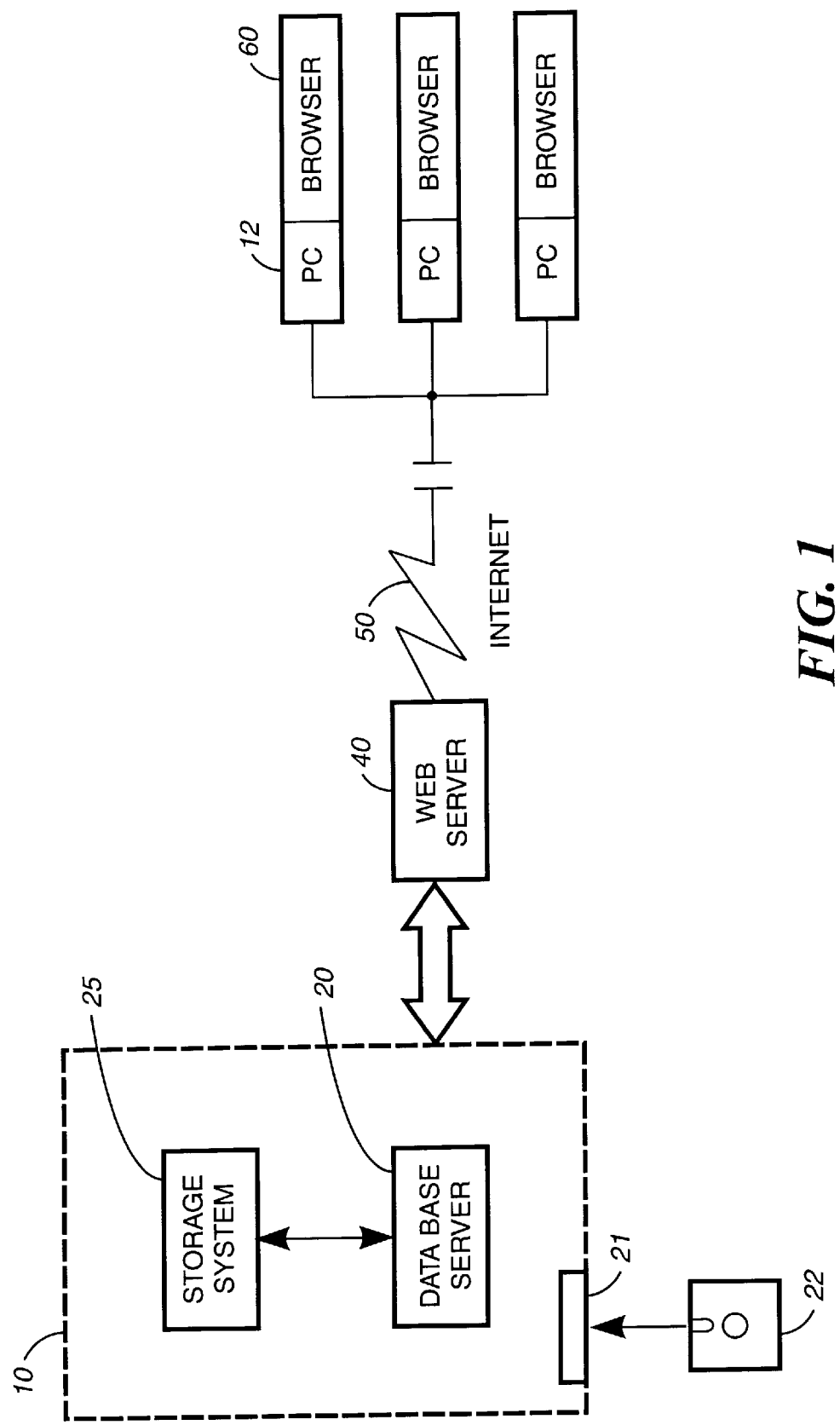
FIG. 1 is a block diagram of a data processing system for hosting Web-based Online directory listing services.

FIG. 1 is a block diagram of a typical data processing system for hosting Web pages 5. Web Server 40 is connected to the Internet 50. A plurality of end-user Data Processing Systems 12 comprising a Web Browser 60 are connected to Internet 50. Web Browser 60 is any HTTP (Hyper-Text-Transfer-Protocol) compatible product such as Netscape Navigator, JAVA Browser or Microsoft Internet Explorer.

Database Server 20 comprises a Storage System 25 connected to Web Server 40. Typically publishers of directory listings such as regional telephone companies provide the name, address, and telephone directory listing information for Database Server 20. Diskette drive 21, capable of reading and writing information from removable medium 22, is electrically connected to Database Server 20. It is important to point out that the precise operating systems and hardware configurations of Database Server 20, Web Server 40, and Web-Browser 60 are not limited to any specific hardware or software configuration. These systems can be implemented on a wide variety of platforms including hardware and software.

Figure 2:
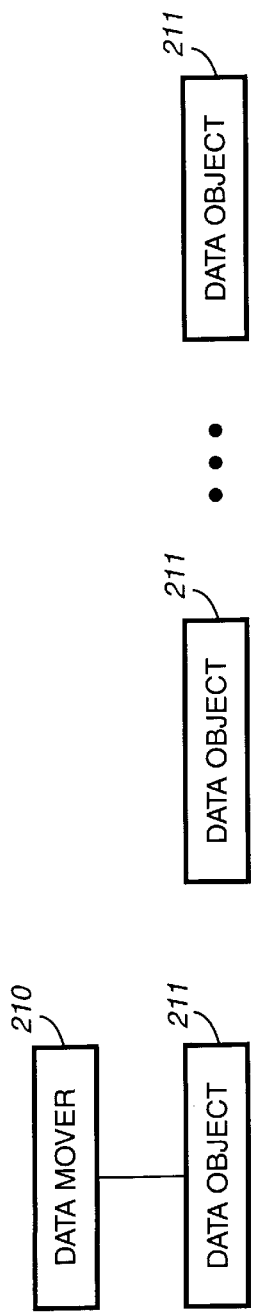
FIG. 2 is a block diagram of the Data Mover Structure employed by the information processing system.
Figure 3:
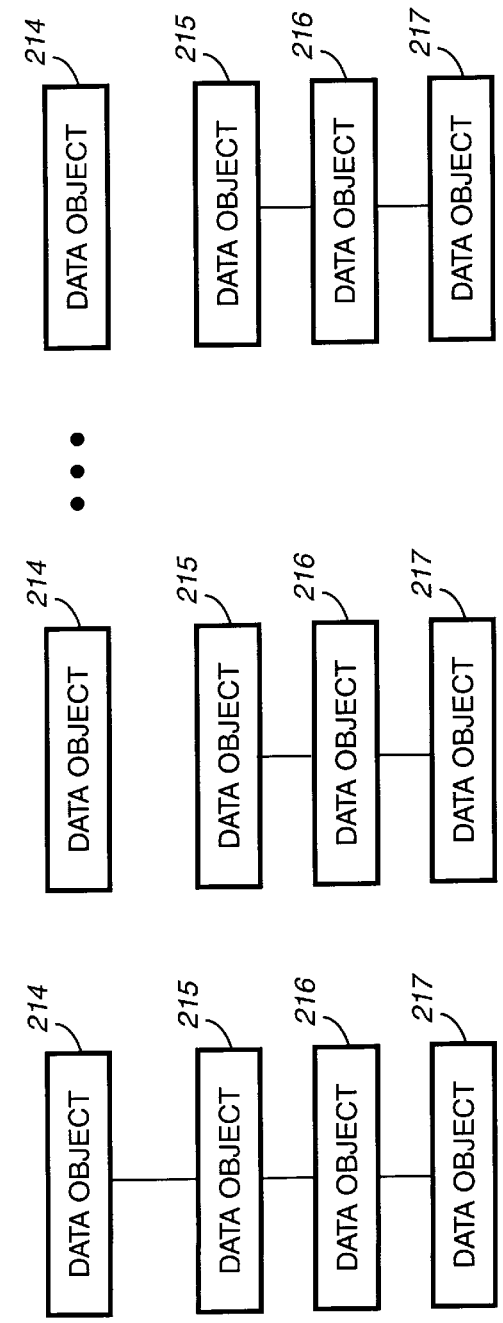
FIG. 3 is a block diagram of the Target Object Classes employed by the information processing system.

FIG. 2 is a block diagram of the Data Mover Structure 210 with a plurality of Data Objects 211. Data Objects 211 are composed of defined classes for moving data between a known source type and known target type. Referring now to FIG. 3, the Data Object of FIG. 3 is further subclassed into three subclasses (1) Source Data 215, (2) Process 216 and (3) Target Data 217. Source Data 215 classes correspond to the precise file format specified by the owners and publishers of the listing data. For example, one owner of the listing data may have his/her data stored in an ASCII file format, another owner of the listing data may have his/her data stored in a popular Database Format (e.g., IBM DataBase/2, Microsoft Excel, Lotus Approach, FoxPro, etc.) and a third owner of the listing data may have his/her data stored in a custom data format. Target Data 217 classes correspond to the specific target data format for the Database Server 20 of FIG. 1. Like the Source Data 215 classes, Target Data 217 classes correspond to specific file format such as ASCII, commercially available database formats or custom formats. Process 216 subclass performs the desired conversion between specific Source Data 215 and specific Target Data 217. For example, for a Source Data 215 subclass corresponding to ASCII data format and a Target Data 217 corresponding to IBM Database/2 format, Process 216 using well-known methods in the industry converts ASCII data format to be compatible with an IBM Database/2 data format. Any new data source or target data source can be accommodated by adding an applicable Data Object 211 with its corresponding subclasses Source Data 215, Process 216 and Target Data 217.

Data Object 211 is polymorphic, i.e., it provides indistinguishable interfaces to Data Mover 210 for all of the Data Object subclasses, such as, Source Data 215, Process 216 and Target Data 217, but has different data conversion behaviors from the point of view of Data Object 211. Data Mover 210 performs the moving operation by being overloaded by the different arguments provided by Data Object 211 and thus performs the identical overall move of data from a specified source to a specified target on a variety of data types.

In an alternate embodiment, Source Data 215 classes include a data access process. The data access process prompts the user of Data Object 211 for identification, such as, userid and password, prior to enabling access to Source Data 215.

While the invention has been illustrated and described in the preferred embodiments, many modifications and changes therein may be affected by those skilled in the art.

It is to be understood that the invention is not limited to the precise construction herein disclosed. Accordingly, the right is reserved to all changes and modifications coming within the true spirit and scope of the invention.

I claim:

1. A method of moving disparate data objects types into a database application wherein each of said disparate data objects is either locally available or retrievable remotely, said method including the steps of:

creating a data mover object;

locating a specified source data type;

creating sub-data objects associated with said data mover object wherein each of said sub-data objects comprises:
   a source data object for receiving a specified source data type;
   a process data object with one or more processes for converting said source data object into a form compatible with said target data object; and
   a target data object associated with said database application;

converting said specified source data type into a format that is compatible with said target data object with one or more processes in said process data object; and moving said data mover object with said specified source data after being converted into said target data.

2. The method of moving disparate data objects types into a database application of claim 1 wherein said disparate data objects are stored in unique custom data formats.

3. The method of moving disparate data objects types into a database application of claim 1 wherein said step of locating of a specified source data type userid and password.

4. The method of claim 1 wherein said database application is a directory listing.

5. An information processing system for running a database application and for providing access thereto, said system comprising:

data mover object;

locating means for locating a specified source data type;

creation means for creating sub-data objects associated with said data mover object wherein said sub-data objects further comprises:
   a source data object for receiving a specified source data type;
   a process data object with one or more processes for converting said source data object into a form compatible with said target data object; and
   a target data object associated with said database application;

conversion means for converting said specified source data type to be compatible with said target data object with one or more processes in said process data object; and moving means for moving said data mover object with said specified source data after being translated into said database application.

6. The information processing system of claim 5 wherein said source data type is available non-locally.

7. The information processing system of claim 5 wherein said disparate data objects are stored in unique custom data formats.

8. The information processing system of claim 5 wherein said locating means requires userid and password authorization for locating a specified source data type.

9. The information processing system of claim 5 wherein said database application comprises a directory listing.

10. A computer-readable storage medium comprising an instruction for causing an information processing system to move disparate data objects into a database application by:

first program instruction means for creating a data mover object;

second program instruction means for locating a specified source data type;

third program instruction means for creating sub-data objects associated with said data mover object where in said sub-data objects further comprises:
    a source data object for receiving a specified source data type
    a process data object with one or more processes for converting said source data object into a form compatible with said target data object; and
    a target data object associated with said database application;

fourth program instruction means for converting said specified source data type to be compatible with said target data object with one or more processes in said process data object; and fifth program instruction means for moving said data mover object with said specified source data after being translated into said database application.

11. The computer-readable medium of claim 10 wherein said source data type is either locally available or non-locally available.

12. The computer-readable medium of claim 10 wherein said disparate data objects are stored in unique custom data formats.

13. The computer-readable medium of claim 10 wherein said locating of a specified data source requires userid and password authorization to access said data source.

14. The computer-readable medium of claim 10 wherein said database application is a directory listing.

* * * * *